No. 845,673. PATENTED FEB. 26, 1907.
W. & S. VANMANEN.
TRUCK.
APPLICATION FILED FEB. 6, 1906.

Witnesses
Lou Cilley.
Cecil C. Cilley.

Inventors
William Vanmanen
Stephen Vanmanen
Lehiel J. Cilley
Attorney

UNITED STATES PATENT OFFICE.

WILLIAM VANMANEN AND STEPHEN VANMANEN, OF GRAND RAPIDS, MICHIGAN

TRUCK.

No. 845,673.  Specification of Letters Patent.  Patented Feb. 26, 1907.

Application filed February 6, 1906. Serial No. 299,850.

*To all whom it may concern:*

Be it known that we, WILLIAM VANMANEN and STEPHEN VANMANEN, citizens of the United States, residing at Grand Rapids, in the county of Kent and State of Michigan, have invented certain new and useful Improvements in Factory-Trucks, of which the following is a specification.

Our invention relates to improvements in carts or trucks for transferring stock in woodworking factories, &c.; and its objects are, first, to provide a truck-corner with which the end rails and the side rails may both be secured to place, so as to make a strong rigid truck with the use of the least possible number of bolts, and, second, to provide a strong rigid truck that may be shipped in the knockdown and readily and conveniently assembled at the point of delivery. We attain these objects by the mechanism illustrated in the accompanying drawings, in which—

Figure 1:
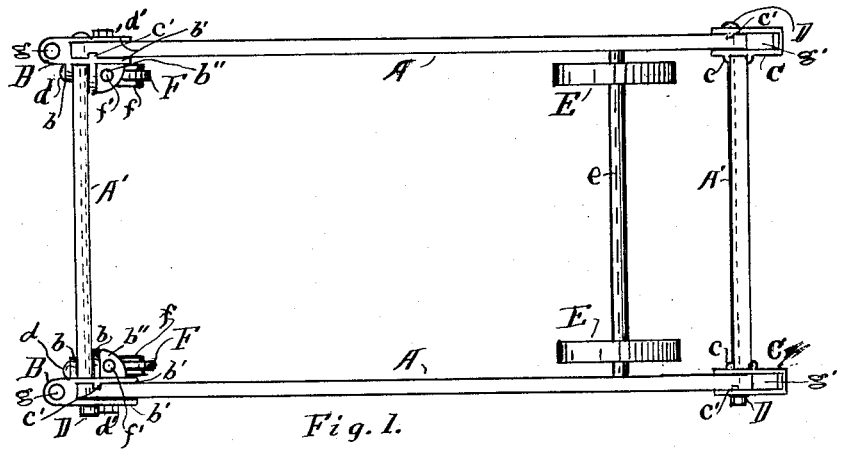
Figure 2:
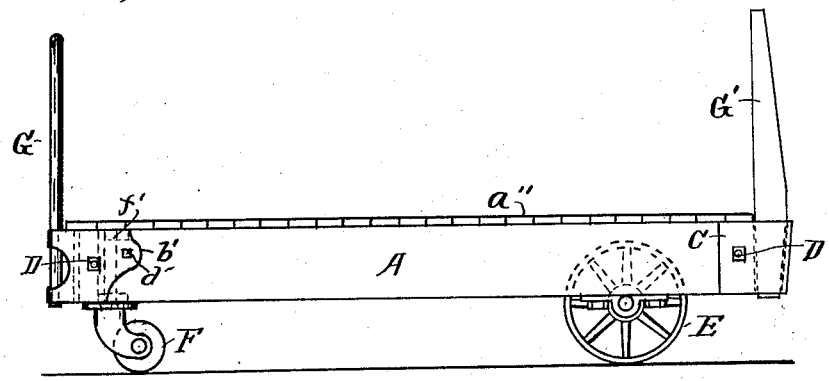
Figure 3:
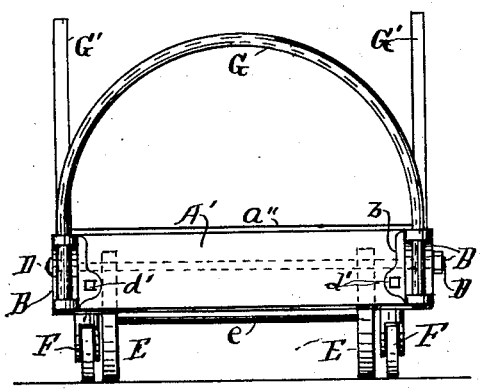

Figure 1 is a top plan of a truck with the floor removed to show the application of the corners. Fig. 2 is a side elevation of the same with the floor in place. Fig. 3 is an end elevation of the same, and Fig. 4 is a perspective of one of the corner-pieces.

Similar letters refer to similar parts throughout the several views.

A A represent the side rails, and A' A' represent end rails. E E represent the principal wheels that support the truck, situated near one end thereof. F F represent a pair of caster-formed wheels and yokes situated at the other end of the truck. G' and G' represent stakes at one end of the truck, and G is a metallic bow arranged to form stakes and a handpiece with which to wheel the truck about the factory. All of these features are common in this class of trucks, our invention being confined to the mechanism for assembling the truck and securing the parts together, which consists of corner-pieces B B at one end and a modified form of the same at the other end, or in case of ordinary light store-trucks the ends or corner-pieces C may be used at both ends of the trucks.

Figure 4:
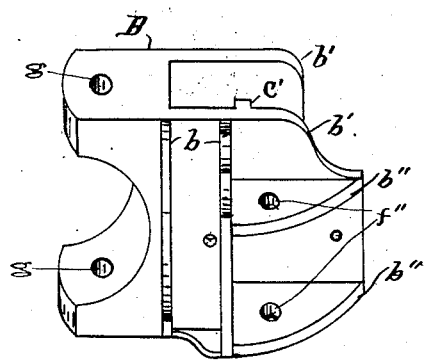

The principal corner-pieces are constructed with a body B, having two wings b' b' extending back to form a receptacle for the ends of the side rails A, and one of these wings has a bead c', designed to engage a corresponding groove across the end of the side rail, as shown in Fig. 1 and indicated in Figs. 2 and 4, and the body is also provided with two sidewise-projecting wings b, designed to receive the ends of the end rails A' of the truck, and the whole is secured together by means of a bolt D, passing through the corner-pieces and the side rails and longitudinally through the end rails, and as these corner-pieces are used upon trucks that are designed to carry heavy loads and to support the casters that carry this end of the trucks they are further secured to the rails by means of bolts d passing through the wings b and the ends of the end rails A', and bolts d' passing through the wings b', and the ends of the side rails A. To support the casters F, two bearings b'' are formed between the adjacent wings b b' and provided with holes f'' for the reception and free revolving of the stems f', which latter are integral with the body f of the caster which receives the wheel, the whole forming the perfected caster F.

The simpler form of corner-piece C has the wings b', practically identical with the corresponding wings on the corner-pieces B, having also the bead c', similarly used, and the ends being secured to place by the long bolt D, passing entirely across the truck, this corner-piece being provided with much shorter wings at c or other suitable means for forming a receptacle for receiving the ends of the end rails A', exactly corresponding with the construction at b in the corner-pieces B, except that the receptacle between the wings is not as deep in the former as in the latter. Another, though minor, difference in the construction of these corner-pieces consists in the forming of a solid body B on the one, with openings g for the reception of the ends of the curved posts or hand-bar G, while with the other the wings extend the entire length of the corner-piece and extend far enough back of the end of the rail A to leave a space g for the reception of the end of the stakes G'.

The object of placing casters F at one end of the truck is to enable the operator to easily turn the truck in any desired direction.

a'' in Figs. 2 and 3 represents the floor of the truck purposely removed from Fig. 1 to allow a free view of the corner-pieces and the supporting-wheels and casters.

Having thus fully described our invention, what we claim as new, and desire to secure by Letters Patent of the United States, is—

In combination with the side rails, the end rails, and the casters of a factory-truck, corner-pieces having longitudinal wings forming receptacles for the ends of the side rails, lateral wings forming receptacles for the ends of the end rails, beads on the longitudinal wings engaging grooves in the side rails, and bearings integral with one of the longitudinal wings and one of the lateral wings and having receptacles for the caster-pintles, said corner-pieces having apertures for the reception of the ends of the stakes, and bolts passing through the corner-pieces, the ends of the side rails, and the length of the end rails securing the side rails and end rails together, substantially as shown and described.

Signed at Grand Rapids, Michigan, February 2, 1906.

WILLIAM VANMANEN.
STEPHEN VANMANEN.

In presence of—
I. J. CILLEY,
URL CILLEY.